A. G. HEGGEM.
STUFFING BOX.
APPLICATION FILED MAR. 4, 1916.
1,256,899. Patented Feb. 19, 1918.
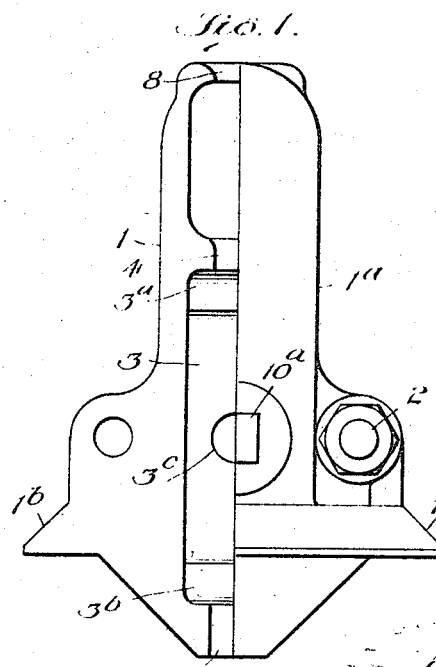
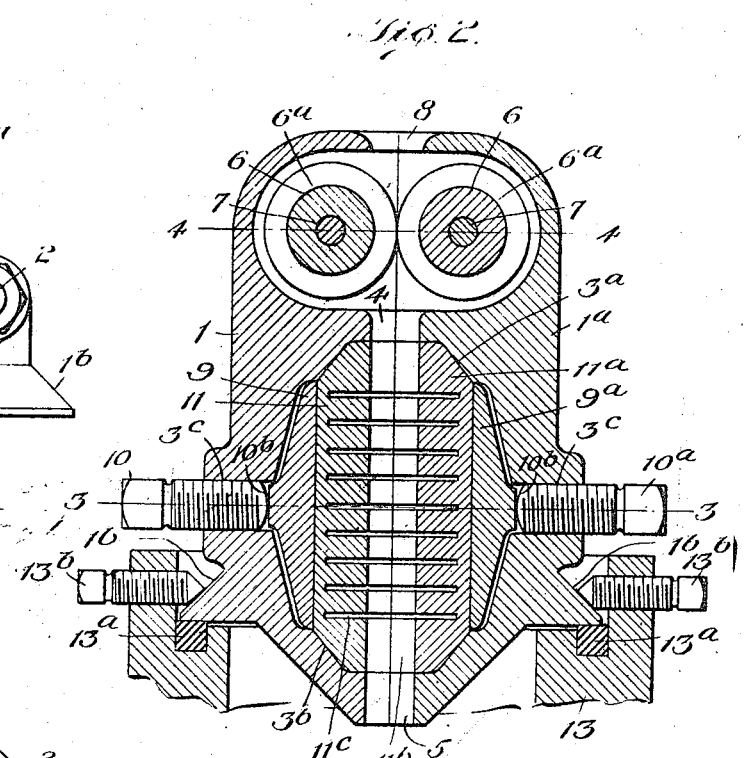
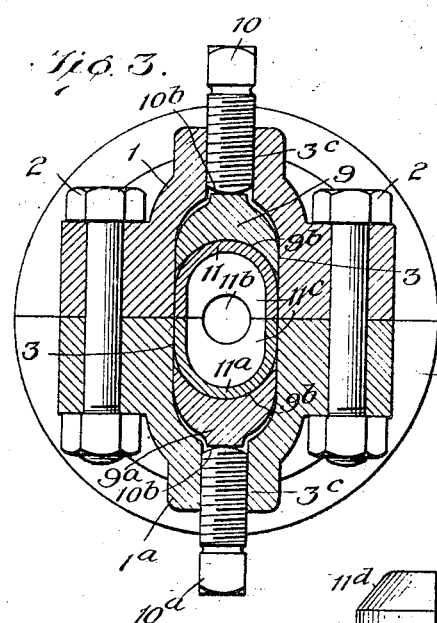
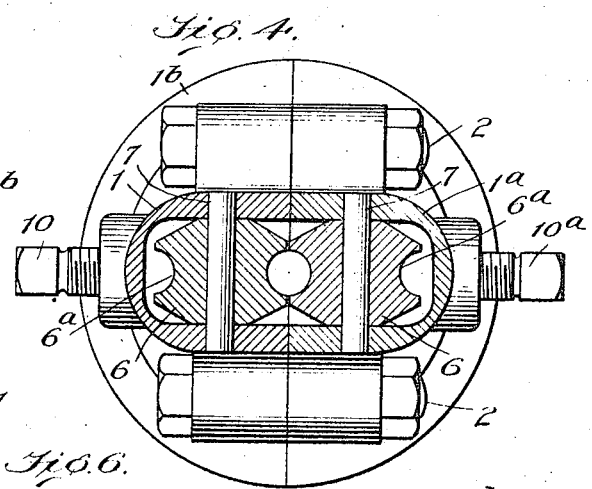
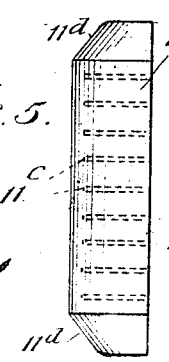
Witness
Edwin L. Bradford
Inventor
Alfred G. Heggem
By Ritter & Ritter
Attorneys

UNITED STATES PATENT OFFICE.

ALFRED G. HEGGEM, OF TULSA, OKLAHOMA.

STUFFING-BOX.

1,256,899.  Specification of Letters Patent.  Patented Feb. 19, 1918.

Application filed March 4, 1916. Serial No. 82,223.

*To all whom it may concern:*

Be it known that I, ALFRED G. HEGGEM, a citizen of the United States, residing at Tulsa, in the county of Tulsa and State of Oklahoma, have invented certain new and useful Improvements in Stuffing-Boxes; and I do hereby declare the following to be a full, clear, and exact description of the invention, such as will enable others skilled in the art to which it appertains to make and use the same.

My invention relates to the construction of stuffing boxes in general where a flexible reciprocating element is to be packed and guided to overcome or minimize side thrust on the gland, but has been especially devised for use where the flexible reciprocating element such as a rope or cable is actuated by a walking beam or equivalent element where the point of application of the power travels in the arc of a circle, and under conditions which preclude the frequent renewal of the packing material, as for instance in the drilling of oil wells where the drilling line or cable assumes an angularity with consequent side thrust on the gland productive of excessive wear on the packing and where the pressure in the well at times precludes the ready renewal of the packing.

To this end, my invention, generally stated, embraces the combination with a stuffing box having alined openings for the passage of a reciprocating element, of packing followers arranged on opposite sides of and parallel with the axis of the alined openings, and means for moving said followers toward said axis in a direction normal thereto.

A further feature of my invention embraces the combination with a longitudinally separable sectional stuffing box having alined openings for the passage of a reciprocating element, of packing followers arranged on opposite sides and parallel with the axis of the alined openings, and means for moving said followers toward said axis in a direction normal thereto.

A still further feature of my invention embraces the combination with a longitudinally separable sectional stuffing box having alined openings for the passage of a reciprocating element, of a plurality of guide spools arranged on opposite sections and on opposite sides of the axis of the alined openings, a plurality of packing followers also arranged in opposite sections and on opposite sides of the axis of the alined openings, and means for adjustably advancing said packing followers toward the axis of the alined openings and normal thereto.

There are other, minor, features of invention, involving special features of elemental construction, all as will hereinafter more fully appear.

In the drawings chosen for the purpose of illustrating my invention, the scope whereof is pointed out in the claims, Figure 1 is a view in elevation of a longitudinally separable sectional stuffing box embodying my invention, one-half of one section thereof being cut away, the guide rollers, packing, and packing followers having been removed.

Fig. 2 is a vertical longitudinal sectional view of a stuffing box, and the guide rollers, packing and packing followers thereof embodying my invention.

Fig. 3 is a transverse section of the same taken on the plane of the line 3—3, Fig. 2.

Fig. 4 is a transverse section thereof taken on the plane of the line 4—4, Fig. 2.

Figs. 5 and 6 are respectively a side elevation and an end view of the flexible packing of the gland.

Like symbols refer to like parts wherever they occur.

I will now proceed to describe my invention more fully so that others skilled in the art to which it appertains may apply the same.

In the drawings, 1, 1ª indicate two longitudinally separable sections constituting a stuffing box, which sections may be conveniently united by means of bolts 2.

The packing chamber 3 of the stuffing box is preferably of oval cross section to accommodate the packing followers, and its end walls 3ª, 3ᵇ preferably converge toward the respective alined openings 4 and 5 through which the flexible reciprocating element with which the stuffing box is used moves.

At or about midlength of the packing chamber 3 the sections 1, 1ª are each provided with a threaded opening 3ᶜ, the axes of which are normal to the axis of the alined openings 4 and 5.

In the separable sections 1, 1ª of the stuffing box above the packing chamber 3 are recesses which when the sections are united constitute a chamber for the reception of the guide rollers or spools 6, 6 which control the lateral vibration of the reciprocating element.

The guide rollers or spools 6 are located in the separate sections 1, 1ᵃ and on opposite sides of the axis of the alined openings 4 and 5, in such position as to contact with the reciprocating element with which the stuffing box is used, are journaled on suitable shafts 7, and are preferably grooved on their peripheries, as at 6ᵃ to embrace and substantially support the reciprocating element.

These guide rollers or spools 6 need not necessarily be inclosed by the casing of the stuffing box, but when so inclosed a suitable opening 8, in alinement with the openings 4 and 5, will be provided for the passage of the reciprocating element.

Within the packing chamber 3 and on opposite sides of the axis of the alined openings 4 and 5 are located longitudinally disposed, normally separated packing followers 9, 9ᵃ parallel to the axis of the alined openings 4 and 5, and adjustable toward said axis on lines normal thereto by means of screws 10, 10ᵃ, which pass through the threaded openings 3ᶜ in the separable sections 1, 1ᵃ and engage the respective packing followers 9, 9ᵃ.

The contact ends 10ᵇ of said adjusting screws 10, 10ᵃ are preferably slightly convex as at 10ᵇ in order to allow of any rocking adjustment of the follower which may become necessary.

These followers 10, 10ᵃ are preferably cupped on their inner faces as at 9ᵇ to receive the sectional packing which packing is preferably oval in cross section and tapered or beveled at its ends, as at 11ᵈ, to engage in the tapered portions 3ᵃ and 3ᵇ of the stuffing box whereby the packing under pressure of the followers is caused to effectively engage the reciprocating element.

The flexible packing, which is preferably of rubber and of oval cross section, is comprised of two longitudinal separable sections 11, 11ᵃ some five or six inches in length, the central or axial opening 11ᵇ between the sections corresponding to the exterior diameter of the reciprocating element with which the stuffing box is used.

On their inner surfaces said packing sections 11, 11ᵃ are preferably provided with deep and narrow transverse grooves 11ᶜ that divide the respective longitudinal separable sections of the packing into laminæ or segments which are separated by channels or chambers that permit the lateral extrusion of the contact ends of the segments or laminæ. These channels 11ᶜ also enhance the flexibility of the sections and their consequent efficiency as a packing as well as enable them to act as wipers for the reciprocating element, while the flexible wall which connects the bases of the segmental packing elements serves to maintain their spaced relation without interfering with their independent flexible movement whereby they adapt themselves to any irregular surfaces on the reciprocating element. If desired, the narrow grooves 11ᶜ may be filled with lard, grease, plumbago and grease, or other lubricant, hard material such as copper, babbitt, wood fiber, asbestos, or vulcanized duck or any combination of hard fiber or metal with a lubricant. It will be noted that the alined openings 4 and 5 of the stuffing box are, as is the usual case in stuffing boxes, of a diameter which approximates that of the reciprocating element, that is to say, are of such diameter relative to the diameter of the reciprocating element as will assure lateral support thereto and counteract vibration of the element which where it exists tends to the rapid displacement and deterioration of the packing.

The stuffing box will, of course, be secured in position where it is to be utilized by any suitable means, but as one of the uses contemplated by me is in connection with the casing head of an oil well, I have shown the stuffing box as provided with a beveled bottom flange 1ᵇ which is adapted to be seated on a packing ring 13ᵃ at the top of a casing head, a portion of which is shown at 13, and to be clamped thereon by the bevel ended screws 13ᵇ.

Having thus described my invention what I claim and desire to secure by Letters Patent is:

1. The combination with a stuffing box having alined openings for the passage of a flexible reciprocating element, the diameters of the alined openings being approximately that of the reciprocating element, of packing followers arranged on opposite sides and parallel with the axis of the alined openings, longitudinally separable flexible packing sections having transverse grooves, and means for independently advancing said followers toward the axis of the alined openings.

2. The combination with a longitudinally separable sectional stuffing box having alined openings for the passage of a flexible reciprocating element, the diameters of the alined openings being approximately that of the reciprocating element, of packing followers arranged on opposite sides and parallel with the axis of the alined openings, longitudinally separable flexible packing sections having transverse grooves, and means for independently advancing said followers toward the axis of the alined openings in a direction normal thereto.

3. The combination with a longitudinally separable sectional stuffing box having alined openings for the passage of a flexible reciprocating element, of a plurality of guide rolls arranged on opposite sections and on opposite sides of the axis of the alined openings, a plurality of packing followers also arranged in opposite sections and on opposite sides of the alined openings of the stuffing box, and means for adjustably advancing said followers toward the axis of the alined openings.

4. The combination with a longitudinally separable sectional stuffing box having alined openings for the passage of a flexible reciprocating element, the diameters of the alined openings being approximately that of the reciprocating element, of packing followers arranged on opposite sides of the axis of the alined openings of the stuffing box, a flexible packing comprised of longitudinally separable sections, and means for independently advancing the packing followers toward the axis of the alined openings of the stuffing box.

5. The combination with a longitudinally separable sectional stuffing box having alined openings for the passage of a flexible reciprocating element, the diameters of the alined openings being approximately that of the reciprocating element, and a packing chamber whose ends converge toward the alined openings, of packing followers arranged on opposite sides of the axis of the alined openings of the stuffing box, longitudinally separable flexible packing members having beveled ends, and means for independently advancing the packing followers toward the axis of the alined openings of the stuffing box.

6. A rubber packing comprised of longitudinally separable sections, said sections involving a plurality of segmental packing elements separated at their contact ends by intervening channels which permit of the lateral extrusion of the contact surfaces of said segmental elements and of the independent flexible movement of said segmental elements.

7. A flexible packing for stuffing boxes comprised of a plurality of longitudinally separable packing members each provided with a plurality of flexible segmental packing elements which are separated at their contact ends by transversely extending grooves, whereby the said segmental packing elements may flex independently of each other to conform to reciprocating irregular surfaces.

8. A flexible packing member involving a plurality of segmental packing elements connected at their bases by comparatively thin flexible walls which maintain the spaced relation of said elements while permitting independent flexible movement thereof.

9. A stuffing box packing comprised of longitudinally separable flexible sections having beveled ends and provided on their interior faces with channels or grooves.

10. The combination with a longitudinally separable sectional stuffing box having alined openings for the passage of a flexible reciprocating element, of cupped followers having their cupped surfaces eccentric to each other, said followers arranged on opposite sides and parallel with the axis of the alined openings, and means for advancing said followers toward the axis of the alined openings.

11. The combination with a longitudinally separable sectional stuffing box having alined openings for the passage of a flexible reciprocating element, of cupped followers having their cupped surfaces eccentric to each other and arranged on opposite sides and parallel with the axis of the alined openings, and means for advancing said followers toward the axis of the alined openings, said followers and the means for advancing the same having a contact which permits of a rocking adjustment of the followers.

12. The combination with a stuffing box having alined openings for the passage of a reciprocating element, the diameters of the alined openings being approximately that of the reciprocating element, of a flexible packing comprised of longitudinally separable sections, longitudinally disposed normally separated packing followers arranged on opposite sides of and parallel with the axis of the alined openings, and means for independently advancing said followers toward the axis of the alined openings in a direction normal thereto.

In testimony whereof I affix my signature.

ALFRED G. HEGGEM.